United States Patent [19]

Schaafsma et al.

[11] B 3,925,422

[45] Dec. 9, 1975

[54] PREPARATION OF 3,4,5,6,7,8-HEXAHYDROCOUMARIN

[75] Inventors: Sijbrandus E. Schaafsma, Beek(L); Johannes J. M. Deumens, Limbricht, both of Netherlands

[73] Assignee: Stamicarbon, B.V., Geleen, Netherlands

[22] Filed: Feb. 27, 1973

[21] Appl. No.: 336,243

[44] Published under the Trial Voluntary Protest Program on January 28, 1975 as document no. B 336,243.

[52] U.S. Cl. ........................ 260/343.2 R; 252/522
[51] Int. Cl.² ...................................... C07D 311/74
[58] Field of Search ............................ 260/343.2 R

[56] References Cited
UNITED STATES PATENTS

| | | | |
|---|---|---|---|
| 2,204,008 | 6/1940 | Britton et al..................... | 260/343.2 |
| 3,442,910 | 5/1969 | Thweatt.......................... | 260/343.2 |

OTHER PUBLICATIONS

Jour. Chem. Soc., sec (C), 1967, (part 1), pp. 101–108.
Russian Chem. Rev. (1968), 37(3), p. 198.
J. Amer. Chem. Soc. Vol. 80, p. 3406, (1958).

*Primary Examiner*—John M. Ford
*Attorney, Agent, or Firm*—Cushman, Darby & Cushman

[57] ABSTRACT

A process for preparing 3,4,5,6,7,8-hexahydrocoumarin is disclosed, wherein 2-($\beta$-carboxyethyl)-cyclohexanone is heated in the presence of catalytic amount of a strong acid having a atmospheric boiling point above 200°C at a temperature of 140°–245°C and a pressure of 6–200 mm Hg.

The hexahydrocoumarin product may be dehydrogenated to form dihydrocoumarin which is used in the perfume industry.

9 Claims, No Drawings

PREPARATION OF 3,4,5,6,7,8-HEXAHYDROCOUMARIN

SUMMARY AND BACKGROUND OF THE INVENTION

The present invention relates to a process for preparing 3,4,5,6,7,8-hexahydrocoumarin, hereinafter referred to simply as hexahydrocoumarin, from 2-(β-carboxyethyl)-cyclohexanone, hereinafter referred to simply as carboxyethyl-cyclohexanone.

Zhurn. Obschei Khim. 26, 1956, pp. 861–865 discloses that hexahydrocoumarin can be prepared by the lactonization of carboxyethylcyclohexanone, by heating the carboxyethylcyclohexanone for a few hours with an excess of a dehydration agent, typically acetic acid anhydride. This procedure, however, is not particularly attractive for commercial use, because it is very difficult to recover hexahydrocoumarin in a sufficiently pure state from the reaction mixture, and only a moderate yield is obtained, In addition, an undesirably large amount of dehydration agent, such as acetic acid anhydride, must be employed. The use of dehydration agents other than acetic acid anhydride, such as phosphorous pentachloride, has the same general deficiencies.

DESCRIPTION OF THE INVENTION

The process of the present invention allows the preparation of hexahydrocoumarin in a manner that is highly suitable for commercial application, wherein the carboxyethylcyclohexanone is lactonized without the use of a dehydration agent, so that the deficiencies of prior processes using such dehydration agents as described above are avoided.

Carboxyethylcyclohexanone is heated in the presence of a catalytic amount of a strong acid, having an atmospheric boiling point above 200°C, to a temperature about 140°–245°C, preferably 150° to 190°C, at a pressure of 6 – 200 mm Hg, preferably 10 –30 mm Hg, for a time sufficient to lactonize the carboxyethylcyclohexanone. The hexahydrocoumarin is readily recovered by bringing the vapor from the heating step to a temperature between the boiling points of water and hexahydrocoumarin, at a pressure which will generally be in the range of 6 to about 760 mm Hg and preferably be the sampe pressure as employed in the heating treatment, to form a condensate containing hexahydrocoumarin. The hexahydrocoumarin produced in the process of the present invention condenses, whereas at least most of the water formed remains in the vapor phase. If the temperature to which the vapors are brought is too close to the boiling point of water, a greater amount of water will condense along with the hexahydrocoumarin, and the condensed water will then react with the condensed hexahydrocoumarin to form carboxyethylcyclohexanone. Therefore, it is preferred to bring the vapors to a temperature at least 10°C above the boiling point of water at the pressure involved, and it is particularly preferred to bring the vapors to a temperature from 30°– 50°C above the boiling temperature of water at the pressure involved, so that the condensed hexahydrocoumarin is free of substantial amounts of carboxyethylcyclohexanone.

The hexahydrocoumarin can also be recovered by condensing the vapor obtained in the heating step at a temperature below 30°C, by preference between 5° and 20°C, and separation of the two liquid layers obtained thereby. The lower layer contains the hexahydrocoumarin and the upper layer the water formed in the lactonization. The pressure of this condensation will be in the range of 6 to about 760 mm Hg and preferably be the same as the pressure employed in the heating step.

The hexahydrocoumarin obtained may contain slight quantities of carboxyethylcyclohexanone, e.g., 3 weight percent of carboxyethylcyclohexanone. If desired, this carboxyethylcyclohexanone may be readily separated from the hexahydrcoumarin by distillation, preferably at diminished pressure at a temperature of 140° to 190°C. The recovered carboxyethylcyclohexanone may be recycled.

Various strong acids having an atmospheric boiling point above 200°C may be employed in the process of the present invention, but it is preferred to use phosphoric acids derived from phosphorous pentoxide such as orthophosphoric acid and sulphuric acid. When sulphuric acid is employed, the hexahydrocoumarin product may be contaminated with bonded sulphur. However, the amount of bonded sulphur is extremely small and do not exceed a few parts per million. If such small amounts of sulphur-containing impurities are objectionable, it is then preferred to use a phosphoric acid. Other suitable acids which can be used in the process of the present invention include benzene sulfonic acid, paratoluene sulfonic acid and ortho-toluene sulfonic acid.

The strong acid may either be added as such to the carboxyethylcyclohexanone, or may be formed in situ in the carboxyethylcyclohexanone by the addition of a compound which upon reaction with water yields the desired acid. For instance, to produce ortho-phosphoric acid, phosphorous pentoxide may be used as the additive compound. The amount of acid which is used in the process of the present invention may be very small, such as, for instance, 0.001 mole of acid per mole of carboxyethylcyclohexanone. Preferably, however, quantities in an amount of about 0.003 to 0.03 moles of acid per mole of carboxyethylcyclohexanone are used, as with amounts of acids within this range a higher reaction rate is obtained than with smaller amounts of acid. The use of more than 0.03 moles of acid per mole of carboxyethylcyclohexanone is possible, i.e. as much as 0.05 or even 0.1 or more moles of acid per mole of carboxyethylcyclohexanone, but these greater amounts of acids do not offer any advantages.

The process of the present invention may be carried out on a continuous basis or a batch basis.

The hexahydrocoumarin produced by the process of the present invention may be dehydrogenated with the aid of a dehydrogenation catalyst, such as palladium on aluminum oxide, at a temperature of 200° – 400°C to form dihydrocoumarin, a compound used in the perfume industry. The dehydrogenation process is described in greater detail in the co-pending application of Thoma and Deumens entitled "Preparation of Dihydrocoumarin and of Alkylated Derivatives," filed on Feb. 23, 1973 Ser. No. 335,114, corresponding to Dutch patent application No. 7.202.539, filed on Feb. 26, 1972, the disclosure of which is hereby incorporated by reference.

EXAMPLES OF THE INVENTION

The invention will be understood more readily by reference to the following examples; however, these examples are intended to illustrate the invention and

Example 1

1,190 g of carboxyethylcyclohexanone were transferred to the distillation flask of a vacuum still which comprised the distillation flask, a stirrer, a cooler, a collecting vessel and a vacuum pump. The carboxyethylcyclohexanone was heated to a temperature of 155°C under a pressure of 13 – 14 mm mercury.

5 g of concentrated (85 weight percent) ortho-phosphoric acid were next introduced into the distillation flask over a period of 1.5 hours, with stirring. During the ortho-phosphoric acid addition, and throughout the remainder of the reaction, the cooler and the collecting vessel were maintained at a temperature of 65° – 70°C. After the addition of the phosphoric acid was complete, the distillation was continued for another 0.5 hours, at which point the temperature of the material in the distillation flask was about 170°C. The distillation was then terminated, with 31 g of residue remaining in the distillation flask, and 1,024 g of condensate collected in the collecting vessel. Most of the water formed during the lactonization was removed through the vacuum pump in the form of water vapor. The distillation flask residue contained 10 g of carboxyethylcyclohexanone and the condensate contained 41 g of carboxyethylcyclohexanone. The carboxyethylcyclohexanone conversion was 95.7 percent.

The condensate contained 95 weight percent of hexahydrocoumarin, which correspond to a yield of 95.5 percent based on the amount of converted carboxyethylcyclohexanone. Distillation of the condensate at a temperature of 135.5° – 136°C and a pressure of 12 mm Hg produced substantially pure hexahydrocoumarin ($N_D^{20}$ : 1.5054). The residue from this distillation step, which contains carboxyethylcyclohexanone and some hexahydrocoumarin, can be recycled.

Example 2

850 g of carboxyethylcyclohexanone were heated to a temperature of 160°C at a pressure of 13 – 14 mm Hg in the distillation flask of the vacuum still used in Example 1.8 g of concentrated (85 weight percent) ortho-phosphoric acid were then added over a period of 0.5 hours with stirring, and the distillation was then continued for an additional 0.5 hours. At the end of this time the temperature of the material in the flask was 175°C. Throughout the distillation the cooler and the collecting vessel were maintained at a temperature of 65° – 70°C.

The 706 g of condensate obtained in the collecting vessel contained 94 weight percent of hexahydrocoumarin and nearly 6 weight percent of carboxyethylcyclohexanone. The 35 g of residue contained 12 g of carboxyethylcyclohexanone, corresponding to a degree of conversion of carboxyethylcyclohexanone of 93.6 percent.

The yield of hexahydrocoumarin, based on the amount of converted carboxyethylcyclohexanone, was 94 percent.

Example 3

920 g of carboxyethylcyclohexanone were heated to a temperature of 160°C under a pressure of 13 – 14 mm Hg in the distillation flask of the vacuum still of Example 1. 6 g of concentrated (96 weight percent) sulphuric acid were then added over a period of 0.5 hours with stirring, with the distillation continued for one hour after the sulphuric acid addition was complete. At the end of that time, the temperature of the material in the distillation flask was 175°C, and the distillation was terminated. Throughout the distillation, the cooler and the collecting vessel were maintained at a temperature of 65° – 70°C and were at the same pressure (13 –14 mm Hg) as the distillation flask.

781 g of condensate were obtained from the collecting vessel, and the condensate contained 98 percent by weight of hexahydrocoumarin, nearly 2 weight percent of carboxyethylcyclohexanone, and about 20 parts per million of sulphur compounds (calculated as sulphur). The 26 g of residue contained 3 g of carboxyethylcyclohexanone, with the carboxyethylcyclohexanone degree of conversion amounting to 98 percent.

The yield of hexahydrocoumarin, based on the amount of converted carboxyethylcyclohexanone, was 95 percent.

What is claimed is:

1. A process for the preparation of 3,4,5,6,7,8-hexahydrocoumarin by the lactonization of 2-(β-carboxyethyl)-cyclohexanone, said process comprising lactonizing the carboxyethylcyclohexanone by heating the carboxyethylcyclohexanone, in the presence of a catalytic amount of a strong acid having an atmospheric boiling point greater than 200°C, to a temperature of about 140 to about 245°C, at a pressure of about 6 to about 200 mm Hg and recovering hexahydrocoumarin from the resulting vapor.

2. Process according to claim 1, wherein the hexahydrocoumarin is recovered by bringing the vapor formed in the reaction to a temperature between the boiling point of water and the boiling point of hexahydrocoumarin at a pressure of 6 to about 760 mm Hg to form a condensate of the hexahydrocoumarin, without substantial condensation of water vapor.

3. Process according to claim 1, wherein the hexahydrocoumarin is recovered by condensing the vapor formed in the reaction at a pressure of 6 to about 760 mm Hg and at a temperature below 30°C with formation of a two liquid layers sytem and separating off the aqueous upper layer.

4. Process according to claim 1, wherein the hexahydrocoumarin is distilled to remove any remaining carboxyethylcyclohexanone therefrom.

5. Process according to claim 2, wherein the vapor is brought to a temperature about 30 to about 50°C above the boiling point of water at a pressure used in the condensation step.

6. Process according to claim 1, wherein the strong acid is used in an amount of from 0.001 to about 0.1 moles per mole of carboxyethylcyclohexanone.

7. Process according to claim 6, wherein the amount of acid used is from 0.003 to 0.03 moles of acid per mole of carboxyethylcyclohexanone.

8. Process according to claim 7, wherein said acid is selected from the group consisting of phosphoric acids derived from phosphorus pentoxide and sulphuric acid.

9. Process according to claim 1, wherein the pressure during the heating of the carboxyethylcyclohexanone is 10 – 30 mm Hg.

* * * * *

UNITED STATES PATENT OFFICE
CERTIFICATE OF CORRECTION

Patent No. 3,925,422          Dated December 9, 1975

Inventor(s) Sijbrandus E. Schaafsma et al

It is certified that error appears in the above-identified patent and that said Letters Patent are hereby corrected as shown below:

In the Heading, after "[21] Appl. No.: 336,243" insert

--Foreign Application Priority Data

March 2, 1972  Netherlands....................72,02745--

Signed and Sealed this sixteenth Day of March 1976

[SEAL]

Attest:

RUTH C. MASON
Attesting Officer

C. MARSHALL DANN
Commissioner of Patents and Trademarks